US010367657B2

(12) United States Patent
Gravel

(10) Patent No.: US 10,367,657 B2
(45) Date of Patent: Jul. 30, 2019

(54) BRIDGE PORT EXTENDER

(71) Applicant: HEWLETT PACKARD ENTERPRISE DEVELOPMENT LP, Houston, TX (US)

(72) Inventor: Mark Allen Gravel, Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 58 days.

(21) Appl. No.: 15/504,236

(22) PCT Filed: Nov. 4, 2014

(86) PCT No.: PCT/US2014/063826

§ 371 (c)(1),
(2) Date: Feb. 15, 2017

(87) PCT Pub. No.: WO2016/072972

PCT Pub. Date: May 12, 2016

(65) Prior Publication Data

US 2017/0279639 A1 Sep. 28, 2017

(51) Int. Cl.

| | |
|---|---|
| ***H04L 12/46*** | (2006.01) |
| ***H04L 12/931*** | (2013.01) |
| ***H04L 12/28*** | (2006.01) |
| ***H04L 29/12*** | (2006.01) |
| ***H04L 12/937*** | (2013.01) |

(52) U.S. Cl.

CPC ...... *H04L 12/4645* (2013.01); *H04L 12/2881* (2013.01); *H04L 12/4633* (2013.01); *H04L 29/12* (2013.01); *H04L 49/00* (2013.01); *H04L 49/253* (2013.01)

(58) Field of Classification Search

CPC ... H04L 12/4645; H04L 29/12; H04L 49/253; H04L 12/2881; H04L 12/4633

See application file for complete search history.

(56) References Cited

U.S. PATENT DOCUMENTS

| | | | | |
|---|---|---|---|---|
| 8,543,826 | B1 | 9/2013 | Hutchison et al. | |
| 9,887,917 | B2 * | 2/2018 | Sundaram | H04L 45/74 |
| 2007/0133791 | A1 * | 6/2007 | Han | H04L 9/12 380/46 |
| 2009/0274162 | A1 | 11/2009 | Gowda et al. | |
| 2009/0307751 | A1 | 12/2009 | Lin et al. | |
| 2013/0091349 | A1 | 4/2013 | Chopra | |

(Continued)

OTHER PUBLICATIONS

"Configuring Media Access Control Security (MACsec)," Apr. 24, 2014, pp, 1-7, Juniper Networks, Inc.

(Continued)

*Primary Examiner* — Tejis Daya

(57) ABSTRACT

Example implementations relate to a bridge port extender. For example, a bridge port extender may include a processor. The processor may receive an Ethernet frame from a network bridge, where the Ethernet frame includes an encapsulated portion and an unencapsulated portion, and where the unencapsulated portion includes an E-tag. The processor may remove the E-tag from the unencapsulated portion to form a modified Ethernet frame. The processor may transmit the modified Ethernet frame to a client device based on the E-tag.

15 Claims, 6 Drawing Sheets

(56) References Cited

U.S. PATENT DOCUMENTS

| | | | | |
|---|---|---|---|---|
| 2013/0117856 | A1* | 5/2013 | Branscomb ......... | H04L 63/0428 726/26 |
| 2013/0322457 | A1 | 12/2013 | Budhia et al. | |
| 2014/0003428 | A1 | 1/2014 | Li et al. | |
| 2014/0177641 | A1 | 6/2014 | Kalkunte et al. | |
| 2014/0269710 | A1* | 9/2014 | Sundaram ............. | H04L 45/302 370/392 |
| 2015/0163173 | A1* | 6/2015 | Chu ........................ | H04L 49/45 370/338 |

OTHER PUBLICATIONS

"Identity-Based Networking Services: MAC Security," 2014, pp. 1-20, Cisco.

"Port Extenders Based on PBB-TE Proposal for 802.1Qbh/802.1BR," Jul. 4, 2011, pp. 1-160, IEEE. Jul. 4, 2011.

International Search Report and Written Opinion, International Application No. PCT/US2014/063826, dated Jun. 22, 2015, pp. 1-11, KIPO.

Mick Seaman, "MACsec Hops," Feb. 10, 2013, pp. 1-16, Revision 2.0, IEEE.

* cited by examiner

BRIDGE PORT EXTENDER

BACKGROUND

A network bridge may be an electronic device that connects multiple networks together. A network bridge may include a plurality of physical ports to interface with different networks.

BRIEF DESCRIPTION OF THE DRAWINGS

Some examples of the present application are described with respect to the following figures.

DETAILED DESCRIPTION

A network bridge may include a plurality of physical ports to interface with different networks via Ethernet cables. When the number of networks to be connected via a network bridge is more than the number of physical ports on the network bridge, a bridge port extender may be used to increase the number of physical ports available to the network bridge. A bridge port extender may be an electronic device that includes a plurality of ports, physical and/or logical, to forward Ethernet frames. A bridge port extender may forward an Ethernet frame from a network bridge based on a forwarding decision determined at the network bridge.

To ensure data confidentiality and integrity when an Ethernet frame is forwarded via a bridge port extender, a bridge port extender may implement multiple instances of the Institute of Electrical and Electronics Engineers (IEEE) 802.1AE protocol. For example, a bridge port extender may implement an instance of the IEEE 802.1AE protocol at an upstream port connecting to a network bridge. The bridge port extender may also implement another instance of the IEEE 802.1AE protocol at an egress port connecting to a client device. However, multiple implementations of the IEEE 802.1AE protocol may increase design complexity of a bridge port extender.

Examples described herein provide a bridge port extender that forwards an Ethernet frame in a transparent manner so that implementations of multiple instances of the IEEE 802.1AE protocol may be avoided. For example, a bridge port extender may receive an Ethernet frame from a network bridge. The Ethernet frame may include an encapsulated portion and an unencapsulated portion. The unencapsulated portion may include an E-tag that is indicative of an egress port of the bridge port extender. The bridge port extender may remove the E-tag from the unencapsulated portion to form a modified Ethernet frame. The bridge port extender may transmit the modified Ethernet frame to a client device based on the E-tag. The client device may decapsulate the encapsulated portion to access a payload of the modified Ethernet frame. In this manner, examples described herein may reduce design complexity of a bridge port extender.

Figure 1:
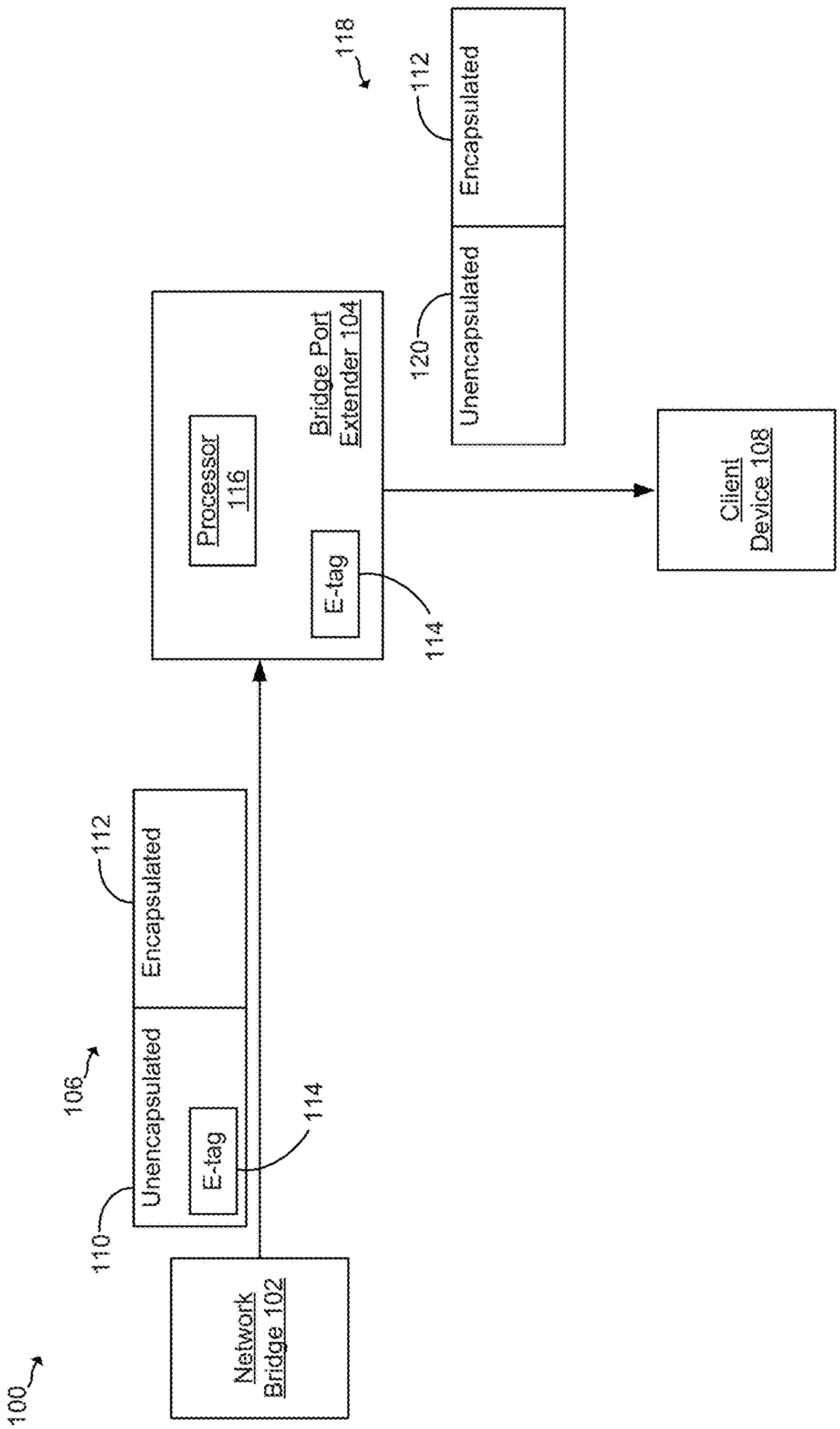
FIG. 1 is a block diagram of an extended bridge including a network bridge and a bridge port extender, according to an example.

Referring now to the figures, FIG. 1 is a block diagram of an extended network bridge 100 including a network bridge 102 and a bridge port extender 104, according to an example. An extended network bridge may be a network bridge coupled to a bridge port extender. Network bridge 102 may be an electronic device or circuitry that enables communications between different networks and/or network segments, such as communications between a wired network and a wireless network. Network bridge 102 may determine how an Ethernet frame is forwarded via bridge port extender 104. For example, network bridge 102 may generate and/or configure a forwarding table used by bridge port extender 104 to forward the Ethernet frame. Thus, network bridge 102 may be a controlling bridge.

Bridge port extender 104 may be an electronic device or circuitry that connects to network bridge 102 to increase the number of ports available to network bridge 102. As an example, bridge port extender 104 may be a bridge port extender in compliance with the IEEE 802.1BR protocol. Bridge port extender 104 may forward an Ethernet frame from network bridge 102 using a forwarding table generated and/or configured by network bridge 102. An example of network bridge 102 and an example of bridge port extender 104 are described in more detail in FIG. 2. In some examples, bridge port extender 104 may be an internal component of network bridge 102. Thus, extended network bridge 100 may be a single device. In some examples, bridge port extender 104 may be a standalone device external to network bridge 102. Thus, extended network bridge 100 may be a combination of multiple devices.

During operation, network bridge 102 may transmit an Ethernet frame 106 to a client device 108 via bridge port extender 104. Client device 108 may be, for example, a notebook computer, a desktop computer, a server computer, a mobile device, a network switch, a bridge port extender, etc. Ethernet frame 106 may include an unencapsulated portion 110 and an encapsulated portion 112. Unencapsulated portion 110 may be data in Ethernet frame 106 is not subjected to an encryption operation, such as an encryption operation in compliance with the IEEE 802.1AE protocol. Encapsulated portion 112 may be data in Ethernet frame 106 is encrypted, such as by an encryption operation in compliance with the IEEE 802.1AE protocol. Unencapsulated portion 110 may include an E-tag 114. E-tag 114 may be a data field that is indicative of an egress port of bridge port extender 104 used to forward Ethernet frame 106. Network bridge 102 may generate E-tag 114 based on the IEEE 802.1BR protocol.

In response to receiving Ethernet frame 106, bridge port extender 104 may modify Ethernet frame 106 via a processor 116 to generate a modified Ethernet frame 118. Processor 116 may be, for example, a central processing unit (CPU), a semiconductor-based microprocessor, and/or other hardware devices suitable to control operations of bridge port extender 104. In some examples, processor 116 may generate modified Ethernet frame 118 based on processor executable instructions (not shown in FIG. 1) stored in bridge port extender 104.

To generate modified Ethernet frame 118, bridge port extender 104 may remove E-tag 114 from unencapsulated portion 110 while leaving encapsulated portion 112 unmodified. Thus, modified Ethernet frame 118 may include a second unencapsulated portion 120 and encapsulated portion 112. Second unencapsulated portion 120 may include content of unencapsulated portion 110 minus E-tag 114. Bridge port extender 104 may identify an egress port (not shown in FIG. 1) of bridge port extender 104 based on E-tag 114. Bridge port extender 104 may transmit modified Ethernet frame 118 to client device 108 using the egress port.

In response to receiving modified Ethernet frame 118, client device 108 may decapsulate encapsulated portion 112 to access data in encapsulated portion 112. For example, client device 108 may decapsulate encapsulated portion 112 based on the IEEE 802.1AE protocol. Thus, encapsulated portion 112 may be passed through bridge port extender 104 in a transparent manner and implementation of the IEEE 802.1AE protocol at bridge port extender 104 may be avoided.

Figure 2:
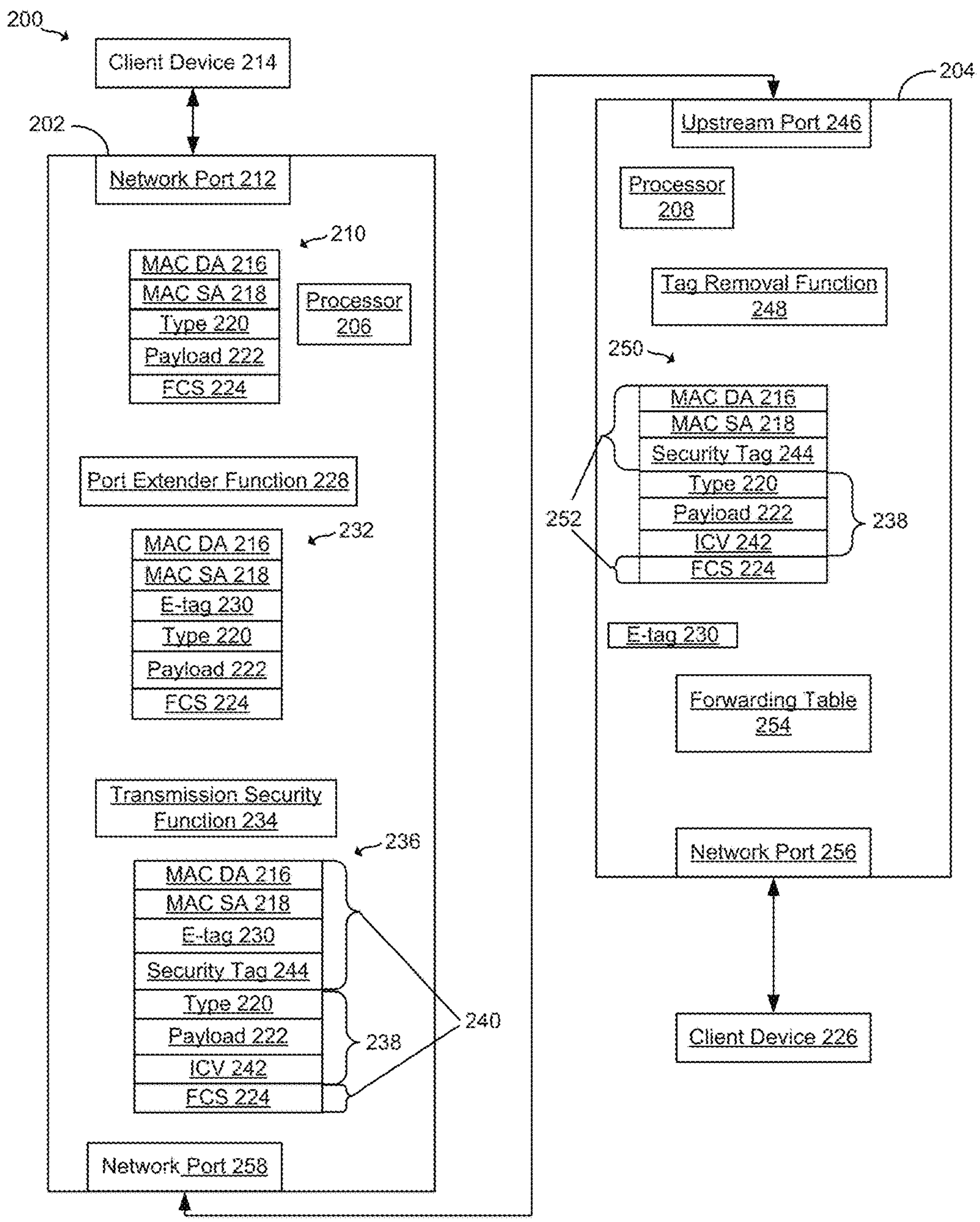
FIG. 2 is a block diagram of an extended bridge including a network bridge and a bridge port extender, according to an example.

FIG. 2 is a block diagram of an extended bridge 200 including a network bridge 202 and a bridge port extender 204, according to an example. Network bridge 202 may be similar to network bridge 102 of FIG. 1. Network bridge 202 may include a processor 206 to control operations of network bridge 202. Bridge port extender 204 may be similar to bridge port extender 104. Bridge port extender 204 may include a processor 208 to control operations of bridge port extender 204. Processors 206 and 208 may be similar to processor 116.

During operation, network bridge 202 may receive an Ethernet frame 210 via a network port 212 of network bridge 202. Ethernet frame 210 may be received from a client device 214. Client device 214 may be similar to client device 108 of FIG. 1. Ethernet frame 210 may include a plurality of fields. For example, Ethernet frame 210 may include a media access control (MAC) destination address (DA) 216, a MAC source address (SA) 218, a type field 220, a payload 222, and a frame check sequence (FCS) 224. Type field 220 may indicate a type of encapsulation mechanism or protocol used to encapsulate payload 222. In some examples, type field 220 may correspond to a length field in compliance with the IEEE 802.3 protocol. FCS 224 may include a value used to detect errors in Ethernet frame 210, such as a value generated using cyclic redundancy check (CRC).

Based on at least one field of Ethernet frame 210, network bridge 202 may determine that payload 222 is destined for a client device 226 coupled to bridge port extender 204. For example, network bridge 202 may use MAC DA 216 to determine the destination of payload 222. In response to a determination that payload 222 is to be forwarded to client device 226 via bridge port extender 204, a port extender function 228 of network bridge 202 may generate an E-tag 230. Port extender function 228 may be implemented using processor executable instructions.

Port extender function 228 may generate E-tag 230 based on at least one field of Ethernet frame 210. For example, E-tag 230 may be generated using MAC DA 216, a destination Internet protocol (IP) address, or a combination thereof. In some examples, E-tag 230 may be generated using any set of fields in Ethernet frame 210 under the open flow protocols. Port extender function 228 may add E-tag 230 to Ethernet frame 210 to form an intermediate Ethernet frame 232. Thus, intermediate Ethernet frame 232 may include MAC DA 216, MAC SA 218, E-tag 230, type field 220, payload 222, and FCS 224.

In some examples, E-tag 230 may include information that is indicative of an egress port of bridge port extender 204 that is used to transmit payload 222 to client device 226. For example, E-tag 230 may include E-channel identification information that is indicative of an egress port of bridge port extender 204. In some examples, E-tag 230 may include an egress port identification that is indicative of an egress port of bridge port extender 204. In some examples, E-tag 230 may also include a tag protocol identification value to indicate the type of E-tag 230. For example, the type of E-tag 230 may be the IEEE 802.1BR E-tag type. In some examples, E-tag 230 may further include an ingress extended port identification information A transmission security function 234 of network bridge 202 may generate a second Ethernet frame 236 based on intermediate Ethernet frame 232. Transmission security function 234 may be implemented using processor executable instructions. Second Ethernet frame 236 may include an encapsulated portion 238 and an unencapsulated portion 240. Encapsulated portion 238 may include type field 220, payload 222, and integrity check value (ICV) 242. Unencapsulated portion 240 may include MAC DA 216, MAC SA 218, E-tag 230, a security tag 244, and FCS 224.

Transmission security function 234 may generate security tag 244 to indicate that a portion of second Ethernet frame 236 is encapsulated. In some examples, security tag 244 may indicate the type of encapsulation mechanism used to generate encapsulated portion 240. In some example, transmission security function 234 may generate encapsulated portion 240 by encrypting type field 220, payload 222, and integrity check value (ICV) 242. Transmission security function 234 may generate ICV 242 based on MAC DA 216, MAC SA 218, security tag 244, type field 220, and payload 222. In some examples, ICV 242 may be a hash value. Network bridge 202 may transmit second Ethernet frame 236 to bridge port extender 204 via a network port 258 of network bridge 202.

Bridge port extender 204 may receive second Ethernet frame 236 via an upstream port 246. Upstream port 246 may be a physical port of bridge port extender 204 that is used to interface with network bridge 202 via an Ethernet cable. In response to receiving second Ethernet frame 236, bridge port extender 204 may modify second Ethernet frame 236 to generate a modified Ethernet frame 250. For example, bridge port extender 204 may generate modified Ethernet frame 250 by removing E-tag 230 from second Ethernet frame 236. A tag removal function 248 of bridge port extender 204 may remove E-tag 230 from second Ethernet frame 236. Thus, unencapsulated portion 240 may form a second unencapsulated portion 252 when E-tag 230 is removed from encapsulated portion 240. Tag removal function 248 may be implemented using processor executable instructions.

Modified Ethernet frame 250 may include encapsulated portion 238 and second unencapsulated portion 252. Second unencapsulated portion 252 may include MAC DA 216, MAC SA 218, security tag 244, and FCS 224. Processor 208 may use E-tag 230 to index a forwarding table 254 to identify an egress port of bridge port extender 204 for forwarding modified Ethernet frame 250 to client device 226. For example, bridge port extender 204 may use the E-channel identification information and/or the egress port identification in E-tag 230 to look up an egress port associated with the E-channel identification information and/or the egress port identification in forwarding table 254. As an example, the identified egress port may be a network port 256. Network port 256 may be a physical port or a logical port. Thus, bridge port extender 204 may transmit modified Ethernet frame 250 to client device 226 via network port 256. In response to receiving modified Ethernet frame 250 at client device 226, client device 226 may decapsulate encapsulated portion 238 to access payload 222.

Thus, encapsulated portion 238 may remain encapsulated prior to a transmission of modified Ethernet frame 250. That is, encapsulated portion 238 is not decapsulated and re-encapsulated again while encapsulated portion 238 is at bridge port extender 204. Similarly, security tag 244 may remain unprocessed prior to the transmission of modified Ethernet frame 250 since encapsulated portion 238 may remain encapsulated. Security tag 244 may be removed when encapsulated portion 238 is deencapsulated. By keeping encapsulated portion 238 unmodified while encapsulated portion 238 is at bridge port extender 204, the design complexity of bridge port extender 204 may be reduced as implementation of a decapsulation mechanism at bridge port extender 204 may be avoided.

When client device 226 is to transmit data, such as payload 222, to client device 214 via bridge port extender 204 and via network bridge 202, bridge port extender 204 may perform the generation of E-tag 230 and network bridge 202 may perform the removal of E-tag 230. For example, client device 226 may generate modified Ethernet frame 250 and transmit modified Ethernet frame 250 to bridge port extender 204. Bridge port extender 204 may generate E-tag 230 via processor 208. Bridge port extender 204 may modify modified Ethernet frame 250 to generate second Ethernet frame 236 may adding E-tag 230 into modified Ethernet frame 250. Bridge port extender 204 may transmit second Ethernet frame 236 to network bridge 202 via upstream port 246.

In response to receiving second Ethernet frame 236, transmission security function may decapsulate encapsulated portion 238 to remove security tag 244 and to form intermediate Ethernet frame 232. Port extender function 228 may remove E-tag 230 from intermediate Ethernet frame 232 to form Ethernet frame 210. Network bridge 202 may transmit Ethernet frame 210 to client device 214.

Figure 3:
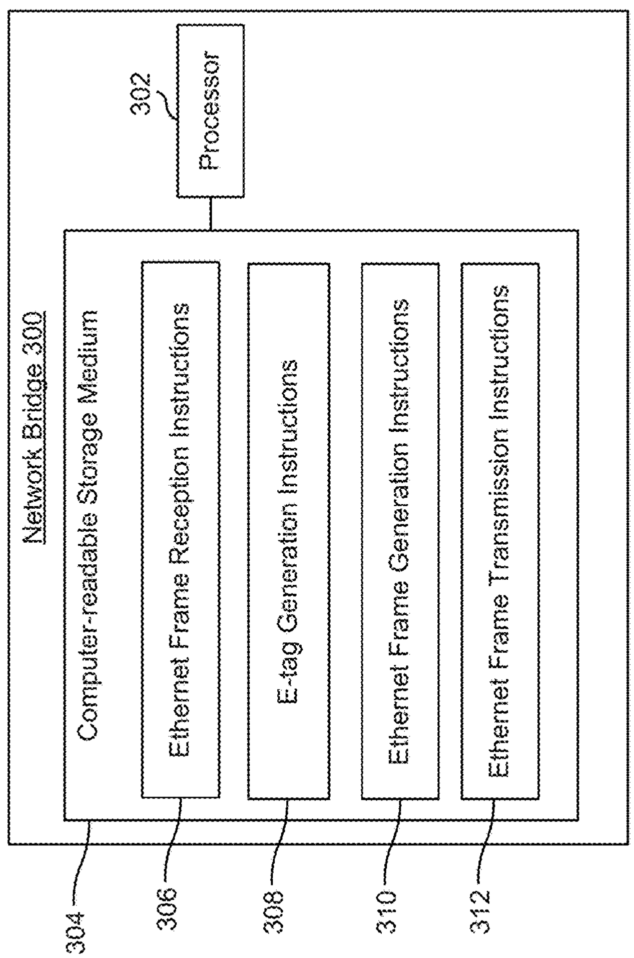
FIG. 3 is a block diagram of a network bridge, according to an example.

FIG. 3 is a block diagram of a network bridge 300, according to an example. Network bridge 300 may implement network bridge 102 of FIG. 1 and/or network bridge 202 of FIG. 2. Network bridge 300 may include a processor 302 and a computer-readable storage medium 304.

Processor 302 may be a central processing unit (CPU), a semiconductor-based microprocessor, and/or other hardware devices suitable for retrieval and execution of instructions stored in computer-readable storage medium 304. Processor 302 may fetch, decode, and execute instructions 306-312 to control a process of generating and transmitting an Ethernet frame that includes an encapsulated portion, such as encapsulated portion 238 of FIG. 2 and an unencapsulated portion, such as unencapsulated portion 240. The unencapsulated portion may include an E-tag. As an alternative or in addition to retrieving and executing instructions, processor 302 may include at least one electronic circuit that includes electronic components for performing the functionality of instructions 306, 308, 310, 312, or a combination thereof.

Computer-readable storage medium 304 may be any electronic, magnetic, optical, or other physical storage device that contains or stores executable instructions. Thus, computer-readable storage medium 304 may be, for example, Random Access Memory (RAM), an Electrically Erasable Programmable Read-Only Memory (EEPROM), a storage device, an optical disc, etc. In some examples, computer-readable storage medium 304 may be a non-transitory storage medium, where the term "non-transitory" does not encompass transitory propagating signals. As described in detail below, computer-readable storage medium 304 may be encoded with a series of processor executable instructions 306-312 for generating and transmitting an Ethernet frame that includes an encapsulated portion and an unencapsulated portion including an E-tag.

Ethernet frame reception instructions 306 may receive an Ethernet frame from a client device, such as client device 214 of FIG. 2. E-tag generation instructions 308 may generate an E-tag based on at least one field of the Ethernet frame, such as a MAC destination address of the Ethernet frame. Ethernet frame generation instructions 310 may generate a second Ethernet frame based on the Ethernet frame. The second Ethernet frame may include the E-tag. Ethernet frame generation instructions 310 may also generate a third Ethernet frame based on the second Ethernet frame. The third Ethernet frame may include an encapsulated portion and an unencapsulated portion including the E-tag. Ethernet frame transmission instructions 312 may transmit the third Ethernet frame to a bridge port extender, such as bridge port extender 204.

Figure 4:
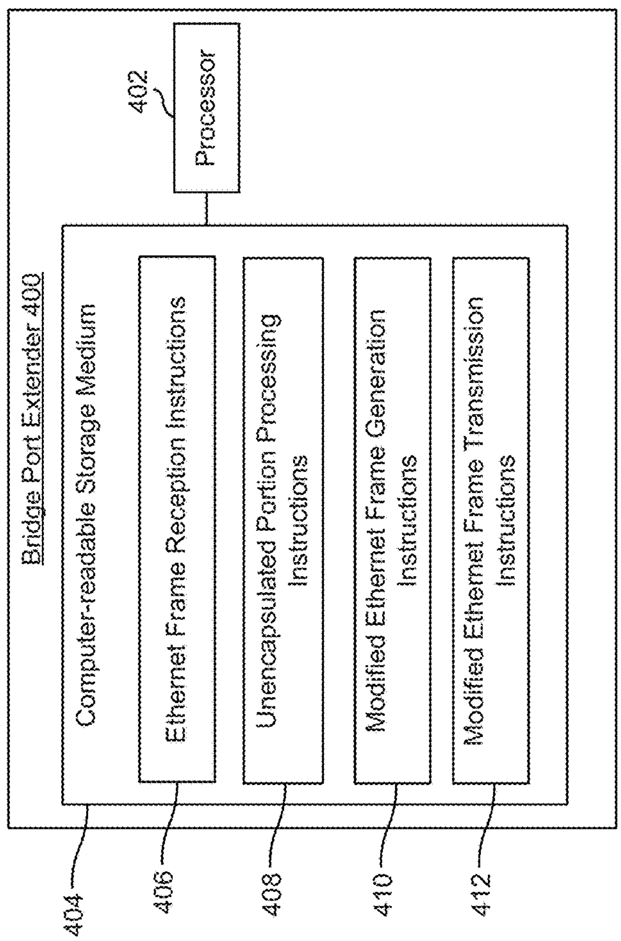
FIG. 4 is a block diagram of a bridge port extender, according to an example.

FIG. 4 is a block diagram of a bridge port extender 400, according to an example. Bridge port extender 400 may implement bridge port extender 104 of FIG. 1 and/or bridge port extender 204 of FIG. 2. Bridge port extender 400 may include a processor 402 and a computer-readable storage medium 404. Processor 402 may be similar to processor 302 of FIG. 3 and computer-readable storage medium 404 may be similar to computer-readable storage medium 304.

Ethernet frame reception instructions 406 may receive an Ethernet frame from a network bridge, such as network bridge 202 of FIG. 2. Unencapsulated portion processing instructions 408 may remove the E-tag in the Ethernet frame. Modified Ethernet frame generation instructions 410 may generate a modified Ethernet frame based on the Ethernet frame. The modified Ethernet frame may include the content of the Ethernet frame minus the E-tag. Modified Ethernet frame generation instructions 410 may also use the E-tag to identify an egress port for transmission of the modified Ethernet frame. Modified Ethernet frame transmission instructions 412 may transmit the modified Ethernet frame to a client device, such as client device 226.

Figure 5:
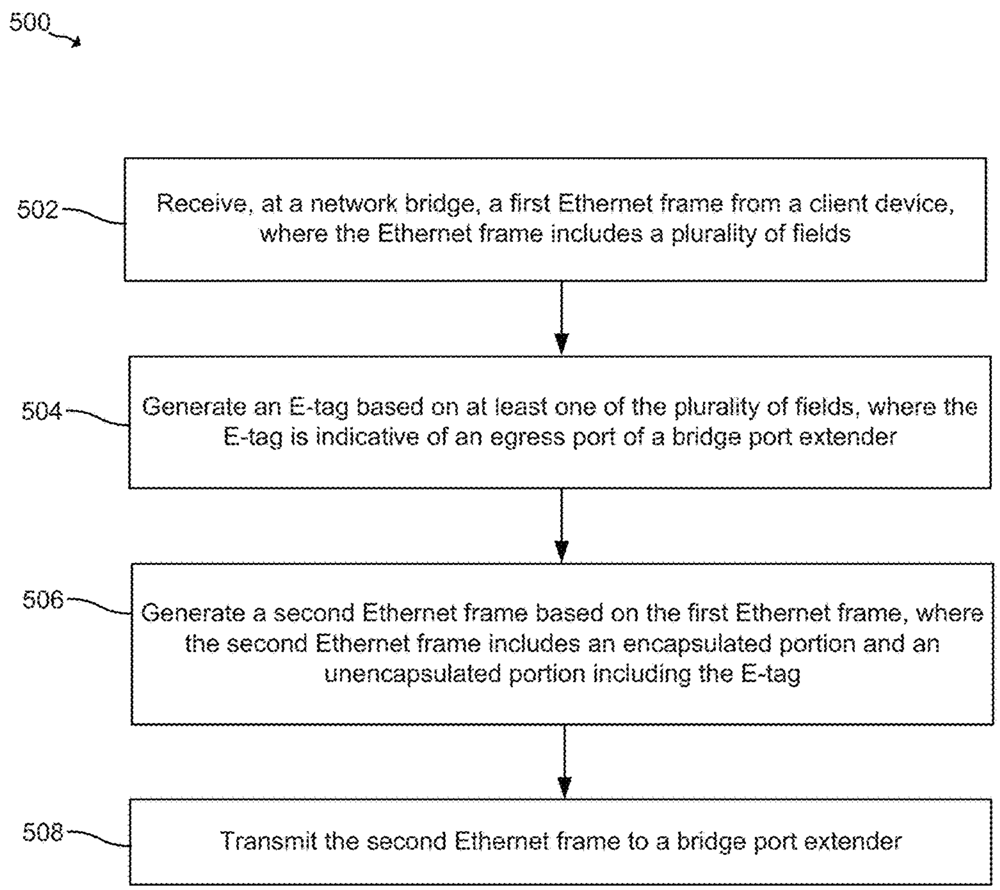
FIG. 5 is a flow chart illustrating a method of generating an Ethernet frame at a network bridge, according to an example.

FIG. 5 is a flow chart illustrating a method 500 of generating an Ethernet frame at a network bridge, according to an example. Method 500 may be implemented by network bridge 102 of FIG. 1, network bridge 202 of FIG. 2, and/or network bridge 300 of FIG. 3. Method 500 includes receiving, at a network bridge, a first Ethernet frame from a client device, where the Ethernet frame includes a plurality of fields, at 502. For example, referring to FIG. 2, network bridge 202 may receive Ethernet frame 210 via network port 212.

Method 500 also includes generating an E-tag based on at least one of the plurality of fields, where the E-tag is indicative of an egress port of a bridge port extender, at 504. For example, referring to FIG. 2, port extender function 228 may generate E-tag 230 based on at least one field of Ethernet frame 210. Method 500 further includes generating a second Ethernet frame based on the first Ethernet frame, where the second Ethernet frame includes an encapsulated portion and an unencapsulated portion including the E-tag, at 506. For example, referring to FIG. 2, transmission security function 234 may generate second Ethernet frame 236 based on intermediate Ethernet frame 232. Second Ethernet frame 236 may include encapsulated portion 238 and unencapsulated portion 240. Encapsulated portion 238 may include type field 220, payload 222, and integrity check value (ICV) 242. Unencapsulated portion 240 may include MAC DA 216, MAC SA 218, E-tag 230, security tag 244, and FCS 224. Method 500 further includes transmitting the second Ethernet frame to a bridge port extender, at 508. For example, referring to FIG. 2, network bridge 202 may transmit second Ethernet frame 236 to bridge port extender 204 via network port 258.

Figure 6:
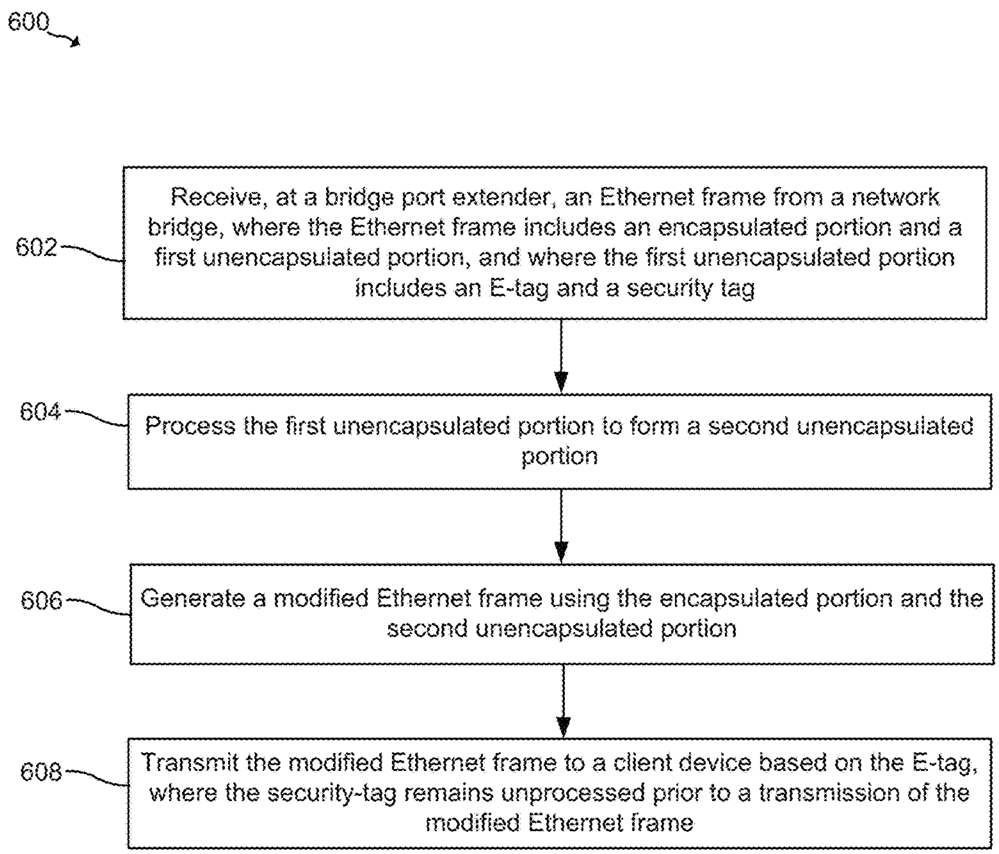
FIG. 6 is a flow chart illustrating a method of processing an Ethernet frame at a bridge port extender, according to an example.

FIG. 6 is a flow chart illustrating a method 600 of processing an Ethernet frame at a bridge port extender, according to an example. Method 600 may be implemented using bridge port extender 104 of FIG. 1, bridge port extender 204 of FIG. 2, and/or bridge port extender 400 of FIG. 4.

Method 600 includes receiving, at a bridge port extender, an Ethernet frame from a network bridge, where the Ethernet frame includes an encapsulated portion and a first unencapsulated portion, and where the first unencapsulated portion includes an E-tag and a security tag, at 602. For example, referring to FIG. 2, bridge port extender 204 may receive second Ethernet frame 236 via an upstream port 246. Method 600 also includes processing the first unencapsulated portion to form a second unencapsulated portion, at 604. For example, referring to FIG. 2, bridge port extender 204 may form modified Ethernet frame 250 by removing E-tag 230 from second Ethernet frame 236. Tag removal function 248 of bridge port extender 204 may remove E-tag 230 from second Ethernet frame 236. Thus, unencapsulated portion 240 may form second unencapsulated portion 252 when E-tag 230 is removed from encapsulated portion 240.

Method 600 further includes generating a modified Ethernet frame using the encapsulated portion and the second unencapsulated portion, at 606. For example, referring to FIG. 2, bridge port extender 204 may modify second Ethernet frame 236 to generate a modified Ethernet frame 250. Method 600 further includes transmitting the modified Ethernet frame to a client device based on the E-tag, where the security-tag remains unprocessed prior to a transmission of the modified Ethernet frame, at 608. For example, referring to FIG. 2, bridge port extender 204 may transmit modified Ethernet frame 250 to client device 226 via network port 256.

The use of "comprising", "including" or "having" are synonymous and variations thereof herein are meant to be inclusive or open-ended and do not exclude additional unrecited elements or method steps.

What is claimed is:

1. A bridge port extender comprising:
a processor to:
receive an Ethernet frame from a network bridge, wherein the Ethernet frame includes an encapsulated portion and an unencapsulated portion, and
wherein the unencapsulated portion includes an E-tag;
remove the E-tag from the unencapsulated portion to form a modified Ethernet frame; and
transmit the modified Ethernet frame to a client device based on the E-tag,
wherein the encapsulated portion is passable through the bridge port extender without de-encapsulation and re-encapsulation of the encapsulated portion to an Institute of Electrical and Electronics Engineers (IEEE) 802.1 AE protocol at the bridge port extender.

2. The bridge port extender of claim 1, wherein the unencapsulated portion further includes a media access control (MAC) destination address, a MAC source address, a security tag, and a frame check sequence (FCS).

3. The bridge port extender of claim 2, wherein the encapsulated portion includes a type field, a payload, and an integrity check value (ICV), and wherein the ICV is generated based on the MAC destination address, the MAC source address, the security tag, the type field, and the payload.

4. The bridge port extender of claim 1, wherein the modified Ethernet frame includes the encapsulated portion and a second unencapsulated portion, and wherein the second unencapsulated portion includes a media access control (MAC) destination address, a MAC source address, a security tag, and a frame check sequence (FCS).

5. The bridge port extender of claim 1, wherein the encapsulated portion remains encapsulated prior to transmission of the modified Ethernet frame.

6. The bridge port extender of claim 1, wherein the E-tag is generated based on a media access control (MAC) destination address, a destination Internet protocol (IP) address, or a combination thereof.

7. A method comprising:
receiving, at a bridge port extender, an Ethernet frame from a network bridge, wherein the Ethernet frame includes an encapsulated portion and a first unencapsulated portion, and wherein the first unencapsulated portion includes an E-tag and a security tag;
processing the first unencapsulated portion to form a second unencapsulated portion;
generating a modified Ethernet frame using the encapsulated portion and the second unencapsulated portion;
tunneling the encapsulated portion through the bridge port extender without de-encapsulation and re-encapsulation of the encapsulated portion pursuant to an Institute of Electrical and Electronics Engineers (IEEE) 802.1AE protocol at the bridge port extender; and
transmitting the modified Ethernet frame to a client device based on the E tag, wherein the security tag remains unprocessed prior to a transmission of the modified Ethernet frame.

8. The method of claim 7, wherein processing the first unencapsulated portion includes removing the E-tag from the first unencapsulated portion.

9. The method of claim 7, wherein the E-tag is generated based on an Institute of Electrical and Electronics Engineers (IEEE) 802.1BR protocol, and wherein the E-tag is indicative of an egress port of the bridge port extender.

10. The method of claim 7, wherein the first unencapsulated portion further includes a media access control (MAC) destination address, a MAC source address, and a frame check sequence (FCS), and wherein the second unencapsulated portion includes the security tag, the MAC destination address, the MAC source address, and the FCS.

11. The method of claim 7, wherein the encapsulated portion includes a type field, a payload, and an integrity check value (ICV).

12. A computer-readable storage medium comprising instructions that when executed cause a processor of a bridge port extender to:
receive an Ethernet frame from a network bridge, wherein the Ethernet frame includes an encapsulated portion and an unencapsulated portion, and wherein the unencapsulated portion includes an E-tag;
remove the E-tag from the unencapsulated portion to form a modified Ethernet frame; identify an egress port associated with the modified Ethernet frame based on the E-tag;
tunnel the encapsulated portion through the bridge port extender without de-encapsulation and re-encapsulation of the encapsulated portion pursuant to an Institute of Electrical and Electronics Engineers (IEEE) 802.1AE protocol at the bridge port extender; and
transmit the modified Ethernet frame to a client device via the egress port.

13. The computer-readable storage medium of claim 12, wherein the unencapsulated portion further includes a media access control (MAC) destination address, a MAC source address, a security tag, and frame check sequence (FCS).

14. The computer-readable storage medium of claim 13, wherein the security tag is unprocessed prior to a transmission of the modified Ethernet frame.

15. The computer-readable storage medium of claim 12, wherein the encapsulated portion includes a type field, a payload, and an integrity check value (ICV).

* * * * *